United States Patent
Moisson et al.

(10) Patent No.: US 10,618,201 B2
(45) Date of Patent: Apr. 14, 2020

(54) METHOD FOR RECYCLING FILAMENTARY THERMOPLASTICS CONTAMINATED BY UNDESIRABLE MATERIALS

(71) Applicant: RECYOUEST, Montfarville (FR)

(72) Inventors: Rosa Marcela Moisson, Montfarville (FR); Jean-Luc Duval, Montfarville (FR)

(73) Assignee: RECYOUEST, Montfarville (FR)

( * ) Notice: Subject to any disclaimer, the term of this patent is extended or adjusted under 35 U.S.C. 154(b) by 239 days.

(21) Appl. No.: 15/757,889

(22) PCT Filed: Sep. 6, 2016

(86) PCT No.: PCT/EP2016/070984
§ 371 (c)(1),
(2) Date: Mar. 6, 2018

(87) PCT Pub. No.: WO2017/042167
PCT Pub. Date: Mar. 16, 2017

(65) Prior Publication Data
US 2019/0168421 A1    Jun. 6, 2019

(30) Foreign Application Priority Data

Sep. 11, 2015 (EP) .................................... 15306392

(51) Int. Cl.
| | | |
|---|---|---|
| *B29B 17/02* | (2006.01) | |
| *B29B 17/00* | (2006.01) | |
| *B29B 17/04* | (2006.01) | |
| *B29L 31/00* | (2006.01) | |
| *B29K 23/00* | (2006.01) | |

(52) U.S. Cl.
CPC .......... *B29B 17/02* (2013.01); *B29B 17/0036* (2013.01); *B29B 17/0412* (2013.01); *B29B 2017/001* (2013.01); *B29B 2017/0234* (2013.01); *B29K 2023/065* (2013.01); *B29L 2031/70* (2013.01); *B29L 2031/707* (2013.01); *B29L 2031/731* (2013.01); *Y02W 30/524* (2015.05); *Y02W 30/62* (2015.05); *Y02W 30/622* (2015.05); *Y02W 30/625* (2015.05)

(58) Field of Classification Search
None
See application file for complete search history.

(56) References Cited

U.S. PATENT DOCUMENTS

| | | | | |
|---|---|---|---|---|
| 6,149,081 A | * | 11/2000 | Horan ................. | B29B 17/0412 241/3 |
| 2002/0117565 A1 | * | 8/2002 | Yajima ................. | B03B 9/06 241/24.2 |
| 2011/0266377 A1 | * | 11/2011 | Lindner ................. | B03B 5/28 241/24.1 |

FOREIGN PATENT DOCUMENTS

DE    41 25 164 A1    2/1992

OTHER PUBLICATIONS

"La stratégie des ressources : la seule vole possible;" Green News Techno; Nov. 7, 2014; pp. 1-8; XP055253490; retreived from http://green-news-techno.net/fichiers/201411070715_GNT_447.pdf on Feb. 26, 2016.
La France Agricole; "Ficelles et filets agricoles usagés : CPA et Adivalor annoncent les premières collectes en avril 2013;" Jan. 15, 2013; 4 pp.; XP055185780; retrieved from http://www.lafranceagricole.fr/actualite-agricole/ficelles-et-filets-agricoles-usages-cpa-et-adivalor-annoncent-les-premieres-collectes-en-avril-2013-67032.html on Apr. 24, 2015.
Dec. 5, 2016 Search Report issued in International Patent Application No. PCT/EP2016/070984.

* cited by examiner

*Primary Examiner* — Mary Lynn F Theisen
(74) *Attorney, Agent, or Firm* — Oliff PLC; R. Brian Drozd

(57) ABSTRACT

A recycling method applied to thermoplastic filaments mixed with undesirable materials. The recycling method includes a feed step and a spreading step. The method continues with a horizontal cutting step wherein the layer of thermoplastic filaments and undesirable materials is leveled, and then a first cutting step wherein the layer is cut in a first vertical direction, and a second cutting step wherein the portions of layers are cut in a second vertical direction orthogonal to the first vertical direction. The method continues with a tearing step, a beating step, a preliminary grinding step, an agglomeration step, a grinding step, a separation step and finally a recovery step.

8 Claims, 1 Drawing Sheet

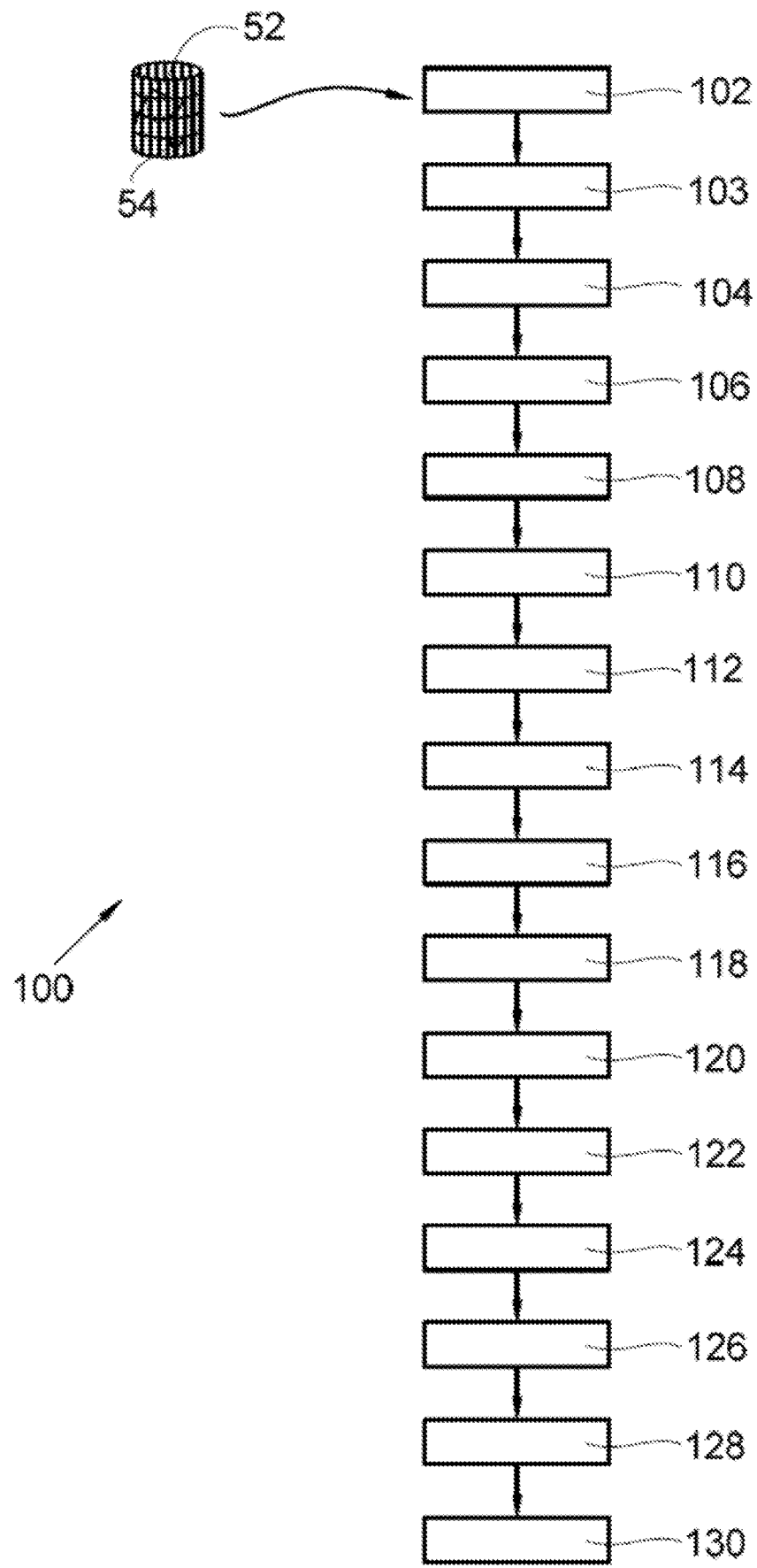

METHOD FOR RECYCLING FILAMENTARY THERMOPLASTICS CONTAMINATED BY UNDESIRABLE MATERIALS

The present invention relates to a method for recycling filamentary thermoplastics contaminated by other materials, in particular threads of high-density polyethylene (HDPE), and a recycling line comprising the means for implementing said recycling method.

The use of HDPE threads is currently very widespread. For example, such threads are used in agriculture for binding round bales of straw.

Currently such threads are not recycled at the end of their life.

The document «Green New Techno» dated Jul. 11, 2014 discloses a recycling of filamentary thermoplastics mixed with undesirable materials. The recycling comprises a feed step, an agglomeration step and a recovery step.

One object of the present invention is to propose a method for recycling filamentary thermoplastics, issuing in particular from packaging, which does not have the drawbacks of the prior art and in particular allows efficient recycling.

To this end, a recycling method is proposed, applying, to thermoplastic filaments mixed with undesirable materials, the recycling method comprising successively:
  a feed step during which the thermoplastic filaments and the undesirable materials are deposited in packets on a horizontal conveyor belt,
  a spreading step during which the thermoplastic filaments and the undesirable materials are spread horizontally so as to form a layer,
  a horizontal cutting step during which the layer of thermoplastic filaments and undesirable materials is leveled in a direction parallel to the conveyor belt,
  a first cutting step during which the layer of thermoplastic filaments and undesirable materials is cut in a first vertical direction, forming portions;
  a second cutting step during which the portions of layers of thermoplastic filaments and undesirable materials are cut in a second vertical direction orthogonal to the first vertical direction,
  a first aspiration step during which the thermoplastic filaments and the undesirable materials thus cut are aspirated upwards,
  a tearing step during which the thermoplastic filaments and undesirable materials thus aspirated are torn,
  a beating step during which the thermoplastic filaments and the undesirable materials thus torn are beaten,
  a preliminary grinding step during which the thermoplastic filaments and the undesirable materials thus beaten are ground in the form of fibrils of 12 to 15 mm,
  an agglomeration step during which the thermoplastic filaments and the undesirable materials thus ground are compacted in the form of thermoplastic agglomerates, while the undesirable materials and a small part of the non-agglomerated thermoplastic fibrils mix and form fines,
  a grinding step during which the thermoplastic agglomerates and the fines are ground so as to make the size of the agglomerates uniform at approximately 12 mm,
  a separation step during which the thermoplastic agglomerates and the fines thus ground and made uniform are separated by gravimetry, and
  a recovery step during which the thermoplastic agglomerates thus separated from the fines are recovered and constitute the recycled thermoplastic.

Advantageously, the recycling method comprises, between the first aspiration step and the tearing step:
  an atomisation step during which the thermoplastic filaments and undesirable materials thus aspirated are wetted by atomisation of water,
  a stirring step during which the thermoplastic filaments and the undesirable materials thus wetted are stirred, and
  a second aspiration step during which the thermoplastic filaments and the undesirable materials thus stirred are aspirated upwards.

Advantageously, the recycling method comprises, before the feed step, a drying step during which the thermoplastic filaments and the waste undergo a reduction in the moisture level to 15%.

Advantageously, the recycling method comprises, after the recovery step, an extrusion step during which the thermoplastic agglomerates recovered undergo an extrusion.

The invention also proposes a recycling line applied to thermoplastic filaments mixed with undesirable materials and comprising successively:
  feed means configured to deposit the thermoplastic filaments and the undesirable materials on a horizontal conveyor belt,
  spreading means configured to spread the thermoplastic filaments and the undesirable materials horizontally in order to form a layer,
  horizontal cutting means configured to level the layer of thermoplastic filaments and undesirable materials in a direction parallel to the conveyor belt,
  first cutting means configured to cut the layer of thermoplastic filaments and undesirable materials in a first vertical direction,
  second cutting means configured to cut the portions of thermoplastic filaments and undesirable materials in a second vertical direction orthogonal to the first vertical direction,
  first aspiration means configured to aspirate the thermoplastic filaments and the undesirable materials upwards,
  tearing means configured to tear the thermoplastic filaments and the undesirable materials,
  beating means configured to beat the thermoplastic filaments and the undesirable materials,
  preliminary grinding means configured to grind the thermoplastic filaments and the undesirable materials in the form of fibrils of 12 to 15 mm,
  agglomeration means configured to compact thermoplastic fibrils and the undesirable materials in the form of thermoplastic agglomerates,
  grinding means configured to grind and make uniform the thermoplastic agglomerates to a size of approximately 12 mm,
  separation means configured to separate by gravimetry the thermoplastic agglomerates and the fines, and
  recovery means configured to recover the thermoplastic agglomerates.

Advantageously, the recycling line further comprises, between the first aspiration means and the tearing means:
  atomisation means configured to wet the thermoplastic filaments and the undesirable materials by atomisation of water,
  stirring means configured to stir the thermoplastic filaments and the undesirable materials, and
  second aspiration means configured to aspirate the thermoplastic filaments and the undesirable materials upwards.

Advantageously, the recycling line comprises, before the feed means, drying means configured to lower the moisture level of the thermoplastic filaments and undesirable materials to 15%.

Advantageously, the recycling line comprises, after the recovery means, extrusion means configured to extrude the thermoplastic agglomerates.

The features of the invention mentioned above, as well as others, will emerge more clearly from a reading of the following description of an example embodiment, said description being given in relation to the single FIGURE, which shows an algorithm of a recycling method according to the invention.

In the following description, the terms relating to a position are taken with reference to the ground.

The single FIGURE shows a recycling method 100 according to the invention.

The recycling method 100 applies to products produced from thermoplastic filaments 52, in particular of HDPE, contaminated by materials of different natures 54, referred to as undesirable materials. They are for example threads produced from HDPE containing residues of straw and dust after use. The recycling method 100 makes it possible to best separate the thermoplastic filaments 52 and the undesirable materials 54 and to provide a recycled raw material based on thermoplastic of so-called "secondary raw material" origin.

The recycling method 100 comprises successively:
- a feed step 102 during which the thermoplastic filaments 52 mixed with undesirable materials 54 are deposited in packets on a horizontal conveyor belt,
- a spreading step 103 during which the thermoplastic filaments 52 and the undesirable materials 54 are spread horizontally so as to form a uniform layer of thermoplastic filaments 52 and the undesirable materials 54 that is conducted to the following step,
- a horizontal cutting step 104 during which the layer of thermoplastic filaments 52 and undesirable materials 54 is leveled in a direction parallel to the conveyor belt, in particular at a thickness of around 8 to 10 cm,
- a first cutting step 106 during which the layer of thermoplastic filaments 52 and undesirable materials 54 is cut in a first vertical direction, in particular by means of a guillotine, forming portions,
- a second cutting step 108 during which the portions of layers of thermoplastic filaments 52 and undesirable materials 54 are cut in a second vertical direction orthogonal to the first vertical direction, in particular by means of a guillotine,
- a first aspiration step 110 during which the thermoplastic filaments 52 and the undesirable materials 54 thus cut are aspirated upwards while the heavy elements fall downwards and are recovered and separated from the thermoplastic filaments 52,
- a tearing step 118 during which the thermoplastic filaments 52 and the undesirable materials 54 thus aspirated are torn, that is to say disentangled by pulling, which among other things causes the detachment of the dust,
- a beating step 120 during which the thermoplastic filaments 52 and the undesirable materials 54 thus torn are beaten, affording separation of the thermoplastic filaments 52 and undesirable materials 54,
- a preliminary grinding step 122 during which the thermoplastic filaments 52 and the undesirable materials 54 thus beaten are ground in the form of fibrils of 12 to 15 mm,
- an agglomeration step 124 during which the thermoplastic fibrils 52 and the undesirable materials 54 thus ground are compacted in the form of thermoplastic agglomerates, while the undesirable materials 54 and a small part of the non-agglomerated thermoplastic fibrils mix and form fines,
- a grinding step 126 during which the thermoplastic agglomerates and the fines are ground so as to make the size of the agglomerates uniform at approximately 12 mm (that is to say +/−3 mm), which makes it possible to increase the apparent density and to have agglomerates that can be best worked subsequently,
- a separation step 128 during which the thermoplastic agglomerates and the fines thus ground and made uniform are separated by gravity, and
- a recovery step 130 during which the thermoplastic agglomerates thus separated from the fines are recovered and stored and constitute the recycled thermoplastic.

Such a recycling method 100 makes it possible to gradually eliminate the majority of the undesirable materials 54 mixed with the thermoplastic filaments 52, in particular in the case of HDPE fibres, by separating the straw from the HDPE. The method comprises a succession of steps that destructure the original materials in accordance with various methods in order on each occasion to separate a part of the undesirable materials 54 from the thermoplastic filaments 52. Furthermore, the recycling method 100 does not use water, which avoids having to purify this water after treatment and thus makes the recycling method 100 particularly ecological.

According to a particular embodiment, in order to eliminate static electricity, the recycling method 100 comprises, between the first aspiration step 110 and the tearing step 118:
- an atomisation step 112 during which the thermoplastic filaments 52 and the undesirable materials 54 thus aspirated are wet by atomisation of water,
- a stirring step 114 during which the thermoplastic filaments 52 and the undesirable materials 54 thus wet are stirred, and
- a second aspiration step 116 during which the thermoplastic filaments 52 and the undesirable materials 54 thus stirred are aspirated upwards, while the heavy elements fall downwards and are recovered in order to leave the process.

The spreading step 103 makes it possible to form a layer of thermoplastic filaments 52 and undesirable materials 54 that is sufficiently dense and even in order then to be able to undergo the horizontal cutting step 104.

The cutting steps 104, 106 and 108 make it possible to divide the thermoplastic filaments 52 in three directions and to limit the size of the thermoplastic filaments 52 and undesirable materials 54 and thus prevent these thermoplastic filaments 52 becoming attached to each other during subsequent steps.

The aspiration steps 110, 116 make it possible to separate the light elements (thermoplastic filaments 52 and the plant fibres of the undesirable materials 54) from the heavy elements (certain undesirable materials 54) that are too heavy to be aspirated, such as for example the piles of moist straw or gravel. This is because the thermoplastic filaments 52 and the light elements of the undesirable materials 54 that remain mixed therein are aspirated upwards while the heavy waste is discharged downwards.

When present, the atomisation step 112 also assists the sliding of the thermoplastic filaments 52 and undesirable materials 54 with respect to each other and the subsequent combing and disentangling.

The tearing step 118 is carried out for example by means of a so-called "opening" machine that disentangles the clusters by means of opening cylinders fitted with spikes. The high-speed rotation of the cylinders divides and makes parallel the thermoplastic filaments 52 and retains some of the waste 54. The elements that are not disentangled are discharged.

The beating step 120 is carried out for example by means of a so-called "beating" machine that comprises a plurality of spiked rollers disposed on top of one another. By successive actions, the thermoplastic filaments 52 and the undesirable materials 54 are combed, which tends to separate and clean them. Some of the undesirable materials 54 thus separated are discharged downwards while the thermoplastic filaments 52 and the remainder of the undesirable materials 54 (in particular plant fibres) continue their upward travel until they leave the beater.

The agglomeration step 124 consists of introducing the thermoplastic fibrils 52 and undesirable materials 54 into a so-called "compacting" machine, which generally has a fixed disc and a disc able to rotate. The discs are grooved radially and the friction provides a rise in temperature that will agglomerate the thermoplastic fibrils 52 in the form of thermoplastic agglomerates. The compactor takes advantage of the agglomeration conditions, which are different between the thermoplastic fibrils 52 and the undesirable materials 54 (in particular the plant fibres), which prevents agglomeration of the thermoplastic fibrils 52 and undesirable materials 54 with each other.

The various steps are performed by suitable machines. Between the various machines, the materials are preferably transported by a pneumatic conveyor that makes it possible to effect de-dusting before entering the following machine, in particular by discharging the dust that was separated from the thermoplastic filaments 52 during the previous step. A particular embodiment of the separation consists of disposing an aspiration fan that generates sufficient negative pressure to aspirate the materials leaving the machine into a duct. Depending on the power of the fan, elements that are too heavy to be aspirated fall onto a recovery belt. A particular embodiment of de-dusting consists of separating the dust and materials to be treated by means of filters and gravity. The small dust then passes through the filters and is discharged with the air while the thermoplastic filaments 52 and the undesirable materials 54 of larger size are blocked by the filters and, with the disappearance of the support of the air flow, fall into the machine carrying out the subsequent treatment step.

A recycling line applied to thermoplastic filaments 52 mixed with undesirable materials 54 and implementing the above recycling method 100 then comprises successively:
feed means configured to deposit the thermoplastic filaments 52 mixed with undesirable materials 54 on the horizontal conveyor belt,
spreading means configured to spread the thermoplastic filaments 52 and the undesirable materials 54 in order to form a uniform layer of thermoplastic filaments 52 and undesirable materials 54 and to conduct it to the following means,
horizontal cutting means configured to level the layer of thermoplastic filaments 52 and undesirable materials 54 in a direction parallel to the conveyor belt, in particular at a thickness of around 8 to 10 cm,
first cutting means, such as for example a guillotine, configured to cut the layer of thermoplastic filaments 52 and undesirable materials 54 in a first vertical direction in order to form portions,
second cutting means, such as for example a guillotine, configured to cut the portions of layers of thermoplastic filaments 52 and undesirable materials 54 in a second vertical direction orthogonal to the first vertical direction,
first aspiration means configured to aspirate the thermoplastic filaments 52 and the undesirable materials 54 upwards, while the heavy elements fall downwards and are recovered,
tearing means configured to tear the thermoplastic filaments 52 and the undesirable materials 54,
beating means configured to beat the thermoplastic filaments 52 and the undesirable materials 54,
preliminary grinding means configured to grind the thermoplastic filaments 52 and the undesirable materials 54 in the form of fibrils of 12 to 15 mm,
agglomeration means configured to compact thermoplastic fibrils 52 in the form of thermoplastic agglomerates,
grinding means configured to grind and thus make uniform the thermoplastic agglomerates to a size of approximately 12 mm,
separation means configured to separate by gravimetry the thermoplastic agglomerates and the fines, and
recovery means configured to recover the thermoplastic agglomerates.

In the case of the presence of atomisation, the recycling line comprises, between the first aspiration means and the tearing means:
atomisation means configured to wet the thermoplastic filaments 52 and the undesirable materials 54 by atomisation of water,
stirring means configured to stir the thermoplastic filaments 52 and the undesirable materials 54, and
second aspiration means configured to aspirate the thermoplastic filaments 52 and the undesirable materials 54 upwards.

The spreading means and the horizontal cutting means consist for example of an automatic loader from the company Pierret Industries known as "Robot", which, by means of retractable teeth driven in a reciprocating movement, spreads the thermoplastic filaments 52 and the undesirable materials 54 towards a discharge channel, where a layer is formed, and which has at the discharge a horizontal cutting system constituting the horizontal cutting means.

The first cutting means and the second cutting means consist for example of two guillotine cutters from Pierret Industries and known as CT60.

The aspiration means consist for example of a transfer fan from the company Laroche and called VT 540 TR, and combined with a heavy-body trapping system from Laroche and called ODT.

The atomisation means consist for example of a pipework lubricating unit from the company Laroche and called OT.

The stirring means consist for example of a mixing cabinet from Laroche called SM 3900. Such a device makes it possible to homogenise the elements to be separated.

The tearing means consist for example of an opening machine from Laroche called Excel 2000.

The beating means consist for example of a cleaner/beater from Laroche NB 6T 2000.

The preliminary grinding means consist for example of a grinder from Herbold called SML 60/100-S5-2.

The agglomeration means consist for example of a buffer silo with a worm that drives the materials between the discs of the compacter, consisting for example of a densifier from Herbold called HV 70/250.

The grinding means consist for example of a grinder from Herbold called SML 45/100-S402.

The separation means consist for example of a gravimetric separator from Herbold called SZS 630/200.

The recovery means consist of any means for storing thermoplastic agglomerates, such as a silo for example.

The whole of the recycling line is earthed and the relative humidity is controlled so as to eliminate the static electricity that may form by rubbing of the plastic waste.

Prior to the feed step 102, the thermoplastic filaments 52 and the undesirable materials 54 undergo a drying step. For this purpose, the recycling line comprises, before the feed means, drying means such as for example a pulsed hot air dryer. This drying step lowers the moisture level of the thermoplastic filaments 52 and undesirable materials 54, to 15% (that is to say +/−3%). Such a drying subsequently prevents sticking of excessively wet elements to each other or in the machines.

The recycling method 100 may also have, after the recovery step 130, an extrusion step during which the thermoplastic agglomerates recovered undergo extrusion. To this end, the recycling line comprises, after the recovery means, extrusion means such as for example a suitable extruder.

The invention claimed is:

1. A recycling method applying, to thermoplastic filaments mixed with undesirable materials, the recycling method comprising successively:
    a feed step during which the thermoplastic filaments and the undesirable materials are deposited in packets on a horizontal conveyor belt,
    a spreading step during which the thermoplastic filaments and the undesirable materials are spread horizontally so as to form a layer,
    a horizontal cutting step during which the layer of thermoplastic filaments and undesirable materials is levelled in a direction parallel to the conveyor belt,
    a first cutting step during which the layer of thermoplastic filaments and undesirable materials is cut in a first vertical direction, forming portions;
    a second cutting step during which the portions of layers of thermoplastic filaments and undesirable materials are cut in a second vertical direction orthogonal to the first vertical direction,
    a first aspiration step during which the thermoplastic filaments and the undesirable materials thus cut are aspirated upwards,
    a tearing step during which the thermoplastic filaments and undesirable materials thus aspirated are torn,
    a beating step during which the thermoplastic filaments and the undesirable materials thus torn are beaten,
    a preliminary grinding step during which the thermoplastic filaments and the undesirable materials thus beaten are ground in the form of fibrils of 12 to 15 mm,
    an agglomeration step during which the thermoplastic filaments and the undesirable materials thus ground are compacted in the form of thermoplastic agglomerates, while the undesirable materials and a small part of the non-agglomerated thermoplastic fibrils mix and form fines,
    a grinding step during which the thermoplastic agglomerates and the fines are ground so as to make the size of the agglomerates uniform at approximately 12 mm,
    a separation step during which the thermoplastic agglomerates and the fines thus ground and made uniform are separated by gravimetry, and
    a recovery step during which the thermoplastic agglomerates thus separated from the fines are recovered and constitute the recycled thermoplastic.

2. The recycling method according to claim 1, further comprising, between the first aspiration step and the tearing step:
    an atomisation step during which the thermoplastic filaments and undesirable materials thus aspirated are wetted by atomisation of water,
    a stirring step during which the thermoplastic filaments and the undesirable materials thus wetted are stirred, and
    a second aspiration step during which the thermoplastic filaments and the undesirable materials thus stirred are aspirated upwards.

3. The recycling method according to claim 1, further comprising, before the feed step, a drying step during which the thermoplastic filaments and the waste undergo a reduction in the moisture level to 15%.

4. The recycling method according to claim 1, further comprising, after the recovery step, an extrusion step during which the thermoplastic agglomerates recovered undergo extrusion.

5. A recycling line applied to thermoplastic filaments mixed with undesirable materials and comprising successively:
    feed means configured to deposit the thermoplastic filaments mixed with undesirable materials on the horizontal conveyor belt,
    spreading means configured to spread the thermoplastic filaments and the undesirable materials in order to form a layer,
    horizontal cutting means configured to level the layer of thermoplastic filaments and undesirable materials in a direction parallel to the conveyor belt,
    first cutting means, configured to cut the layer of thermoplastic filaments and undesirable materials in a first vertical direction,
    second cutting means configured to cut portions of thermoplastic filaments and undesirable materials in a second vertical direction orthogonal to the first vertical direction,
    first aspiration means configured to aspirate the thermoplastic filaments and the undesirable materials upwards,
    tearing means configured to tear the thermoplastic filaments and the undesirable materials,
    beating means configured to beat the thermoplastic filaments and the undesirable materials,
    preliminary grinding means configured to grind the thermoplastic filaments and the undesirable materials in the form of fibres measuring 12 to 15 mm,
    agglomeration means configured to compact thermoplastic fibrils and the undesirable materials in the form of thermoplastic agglomerates,
    grinding means configured to grind and make uniform the thermoplastic agglomerates to a size of approximately 12 mm,
    separation means configured to separate by gravimetry the thermoplastic agglomerates and the fines, and
    recovery means configured to recover the thermoplastic agglomerates.

6. The recycling line according to claim 5, further comprising, between the aspiration means and the tearing means:

atomisation means configured to wet the thermoplastic filaments and the undesirable materials by atomisation of water, stirring means configured to stir the thermoplastic filaments and the undesirable materials, and second aspiration means configured to aspirate the thermoplastic filaments and the undesirable materials upwards.

7. The recycling line according to claim 5, further comprising, before the feed means, drying means configured to lower the moisture level of the thermoplastic filaments and undesirable materials to 15%.

8. The recycling line according to claim 5, further comprising, after the recovery means, extrusion means configured to extrude the thermoplastic agglomerates.

* * * * *